(12) United States Patent
Ramakrishnan et al.

(10) Patent No.: US 12,275,532 B2
(45) Date of Patent: Apr. 15, 2025

(54) GAS TURBINE ENGINE NOISE REDUCTION

(71) Applicant: General Electric Company, Schenectady, NY (US)

(72) Inventors: Kishore Ramakrishnan, Rexford, NY (US); Trevor Howard Wood, Clifton Park, NY (US); Harry Kirk Mathews, Jr., Clifton Park, NY (US); Eric Richard Westervelt, Niskayuna, NY (US); Honggang Wang, Clifton Park, NY (US); Timothy Richard DePuy, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 109 days.

(21) Appl. No.: 17/887,872

(22) Filed: Aug. 15, 2022

(65) Prior Publication Data
US 2024/0051673 A1  Feb. 15, 2024

(51) Int. Cl.
*B64D 31/06* (2024.01)
*B64D 27/10* (2006.01)
*B64D 27/24* (2024.01)
*B64D 27/02* (2006.01)

(52) U.S. Cl.
CPC ............ *B64D 31/06* (2013.01); *B64D 27/10* (2013.01); *B64D 27/24* (2013.01); *B64D 27/026* (2024.01); *F05D 2270/333* (2013.01)

(58) Field of Classification Search
CPC ........... F05D 2270/02; F05D 2270/304; F05D 2270/333; F02C 7/32; F02C 7/36
See application file for complete search history.

(56) References Cited

U.S. PATENT DOCUMENTS

| | | | |
|---|---|---|---|
| 3,747,343 A * | 7/1973 | Rosen | F02K 3/06 |
| | | | 416/245 A |
| 4,419,045 A | 12/1983 | Andre et al. | |
| 4,534,526 A | 8/1985 | Metzger et al. | |
| 4,709,882 A | 12/1987 | Galbraith | |
| 4,917,336 A | 4/1990 | Jacobs et al. | |
| 4,934,825 A | 6/1990 | Martin | |
| 4,976,102 A | 12/1990 | Taylor | |
| 5,148,402 A | 9/1992 | Magliozzi et al. | |
| 5,156,353 A | 10/1992 | Gliebe et al. | |
| 5,190,441 A | 3/1993 | Murphy et al. | |
| 5,197,855 A | 3/1993 | Magliozzi et al. | |
| 5,259,187 A | 11/1993 | Dunbar et al. | |
| 5,789,678 A | 8/1998 | Pla | |
| 6,341,747 B1 | 1/2002 | Schmidt et al. | |

(Continued)

OTHER PUBLICATIONS

Carney et al., Weight Assessment for Fuselage Shielding on Aircraft with Open-Rotor Engines and Composite Blade Loss, NASA/TM-2013-216582, 2013, 33 Pages.

(Continued)

*Primary Examiner* — Thuyhang N Nguyen
(74) *Attorney, Agent, or Firm* — Dority & Manning, P.A.

(57) ABSTRACT

An aircraft engine includes a low pressure spool, a high pressure spool, and an alternative power source. The alternative power source is configured to add power to the high pressure spool. A controller is configured to determine a noise sensitive condition; and control, in response to determining the noise sensitive condition, the alternative power source to add power to the high pressure spool.

20 Claims, 4 Drawing Sheets

(56) References Cited

U.S. PATENT DOCUMENTS

| | | | |
|---|---|---|---|
| 6,546,734 B2 | 4/2003 | Antoine et al. | |
| 7,578,132 B2 | 8/2009 | Webster | |
| 7,665,963 B2 | 2/2010 | Bogue et al. | |
| 8,011,613 B2 | 9/2011 | Belleville | |
| 8,083,482 B2 | 12/2011 | Serven et al. | |
| 8,087,607 B2 | 1/2012 | Moore et al. | |
| 8,186,617 B2 | 5/2012 | Llamas Sandin | |
| 8,196,860 B2 | 6/2012 | Gall et al. | |
| 8,210,798 B2 | 7/2012 | Stern | |
| 8,220,586 B2 | 7/2012 | Todorovic | |
| 8,240,609 B2 | 8/2012 | Parazzoli et al. | |
| 8,350,398 B2 | 1/2013 | Butt | |
| 8,550,397 B2 | 10/2013 | Verde Preckler et al. | |
| 8,690,106 B1 | 4/2014 | Reissig | |
| 8,967,967 B2 | 3/2015 | Stretton et al. | |
| 9,057,329 B2 | 6/2015 | Weir et al. | |
| 9,102,397 B2 | 8/2015 | Wood | |
| 9,193,451 B2 | 11/2015 | Salyer | |
| 9,527,578 B2 | 12/2016 | Towkan | |
| 9,540,094 B2 | 1/2017 | Negulescu et al. | |
| 9,725,155 B2 | 8/2017 | Miller et al. | |
| 9,745,051 B2 | 8/2017 | Tantot et al. | |
| 9,758,254 B2 | 9/2017 | Moore et al. | |
| 9,759,160 B2 | 9/2017 | Sankrithi et al. | |
| 9,856,745 B2 | 1/2018 | Ali | |
| 9,890,657 B2 | 2/2018 | Ali | |
| 10,118,710 B2 | 11/2018 | Derrez et al. | |
| 10,131,441 B2 | 11/2018 | Edwards et al. | |
| 10,202,865 B2 | 2/2019 | Breeze-Stringfellow et al. | |
| 10,370,086 B2 | 8/2019 | Vion et al. | |
| 10,378,452 B1 | 8/2019 | Barmichev et al. | |
| 10,399,664 B2 | 9/2019 | Bowden et al. | |
| 10,399,689 B2 | 9/2019 | Darnell et al. | |
| 10,414,486 B2 | 9/2019 | Wood et al. | |
| 10,414,497 B2 | 9/2019 | Velez De Mendizabal Alonso et al. | |
| 10,644,630 B2 * | 5/2020 | Smith | F01D 15/10 |
| 10,669,881 B2 | 6/2020 | Breeze-Stringfellow et al. | |
| 10,843,807 B2 | 11/2020 | Bevirit et al. | |
| 10,909,962 B2 | 2/2021 | Goto et al. | |
| 11,014,682 B2 | 5/2021 | Colavincenzo et al. | |
| 11,420,735 B2 * | 8/2022 | Snider | B64C 27/52 |
| 11,686,256 B2 * | 6/2023 | Kathirchelvan | G01H 17/00 60/39.24 |
| 2008/0245925 A1 | 10/2008 | Udall | |
| 2012/0195739 A1 | 8/2012 | Kingan | |
| 2013/0115083 A1 | 5/2013 | Vuillemin | |
| 2013/0327014 A1 | 12/2013 | Moulebhar | |
| 2014/0248116 A1 | 9/2014 | Ali | |
| 2015/0291276 A1 | 10/2015 | Zatorski et al. | |
| 2015/0344127 A1 | 12/2015 | Wood et al. | |
| 2016/0010487 A1 | 1/2016 | Breeze-Stringfellow et al. | |
| 2016/0333729 A1 | 11/2016 | Miller et al. | |
| 2016/0333734 A1 | 11/2016 | Bowden et al. | |
| 2016/0368592 A1 | 12/2016 | Szymandera | |
| 2017/0002688 A1 | 1/2017 | Beutin et al. | |
| 2017/0102006 A1 | 4/2017 | Miller et al. | |
| 2017/0159571 A1 | 6/2017 | Sidelkovskiy | |
| 2017/0225773 A1 | 8/2017 | Wood et al. | |
| 2017/0356654 A1 | 12/2017 | Locke et al. | |
| 2018/0065727 A1 | 3/2018 | Gruber et al. | |
| 2018/0079492 A1 | 3/2018 | Seidel et al. | |
| 2018/0127084 A1 | 5/2018 | Tajan et al. | |
| 2018/0354634 A1 | 12/2018 | Jodet et al. | |
| 2020/0003073 A1 | 1/2020 | Karapurath et al. | |
| 2020/0023957 A1 * | 1/2020 | Kearney-Fischer | B64C 11/305 |
| 2020/0309045 A1 | 10/2020 | Gomez | |
| 2020/0392906 A1 * | 12/2020 | Turner | F02C 9/28 |
| 2021/0108523 A1 | 4/2021 | Miller et al. | |
| 2021/0108576 A1 | 4/2021 | Adibhatla et al. | |
| 2021/0171212 A1 | 6/2021 | Keller et al. | |

OTHER PUBLICATIONS

Gazzaniga et al., Wind Tunnel Performance Results of Swiri Recovery Vanes as Tested with an Advanced High Speed Propeller, AIAA-92-3770, 28$^{th}$ Joint Propulsion Conference Exhibit, Nashville TN, Jul. 6-8, 1992, 42 Pages.

Hultgren, A Comparison of Combustor-Noise Models, AIAA-2012-2087, 18$^{th}$ AIAA/CEAS Aeroacoustics Conference (33$^{rd}$ AIAA Aeroacoustics Conference) Colorado Springs, CO, Jun. 4-6, 2012, 27 Pages. (Abstract Only) https://arc.aiaa.org/doi/10.2514/6.2012-2087.

Open Rotor Engine and Installation, European Aviation Safety Agency, Notice of Proposed Amendment 2015-22, RMT.0384 (MDM. 092) Dec. 21, 2015, 96 Pages.

* cited by examiner

GAS TURBINE ENGINE NOISE REDUCTION

FIELD

The present disclosure relates to gas turbine engine noise reduction.

BACKGROUND

Aviation authorities and governments seek to limit how much noise an aircraft may produce, for example, through regulations. Such regulations may set an allowable level of community noise and cabin noise.

Community noise may include noise produced near ground level during takeoff and landing operations. An allowable level of community noise may depend on a location and a time of day.

Engines are a major contributor to the noise emitted by an aircraft. Improvements to reduce the noise emitted from engines and reduce the overall noise of the aircraft would be welcomed in the art.

BRIEF DESCRIPTION OF THE DRAWINGS

A full and enabling description of the present disclosure, including the best mode thereof, directed to one of ordinary skill in the art, is set forth in the specification, which refers to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

In certain exemplary embodiments, an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore, in certain exemplary embodiments, aspects of the airflow through the third stream (e.g., airstream, mixing, or exhaust properties), and, the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low speed turbine" defines a component configured to operate at a rotational speed, such as a maximum allowable rotational speed, lower than a "high speed turbine" at the engine.

The present disclosure is generally related to systems and methods for controlling a turbofan engine to limit noise. In particular, the present disclosure is generally related to systems and method for controlling one or more engines to reduce noise in response to a noise sensitive condition.

A noise sensitive condition may include noise limits at locations and time of day along a flight path, and during operations including departure and approach. A noise sensitive condition may also include a noise value approaching or exceeding a selected noise threshold. For example, the noise value may be determined based on a sensor measurement associated with an engine.

In general, a controller is configured to control an alternative power source, along with other operating conditions and geometries of the engine, to change an operating point (e.g., on a compressor map) in response to a noise sensitive condition. Alternative power sources may include a fuel cell, an auxiliary power unit (APU), a battery, combinations thereof, and the like.

For example, the controller may control the alternative power source, operating conditions, and geometries to reduce noise while maintaining an overall level of thrust of the engine.

Figure 1:
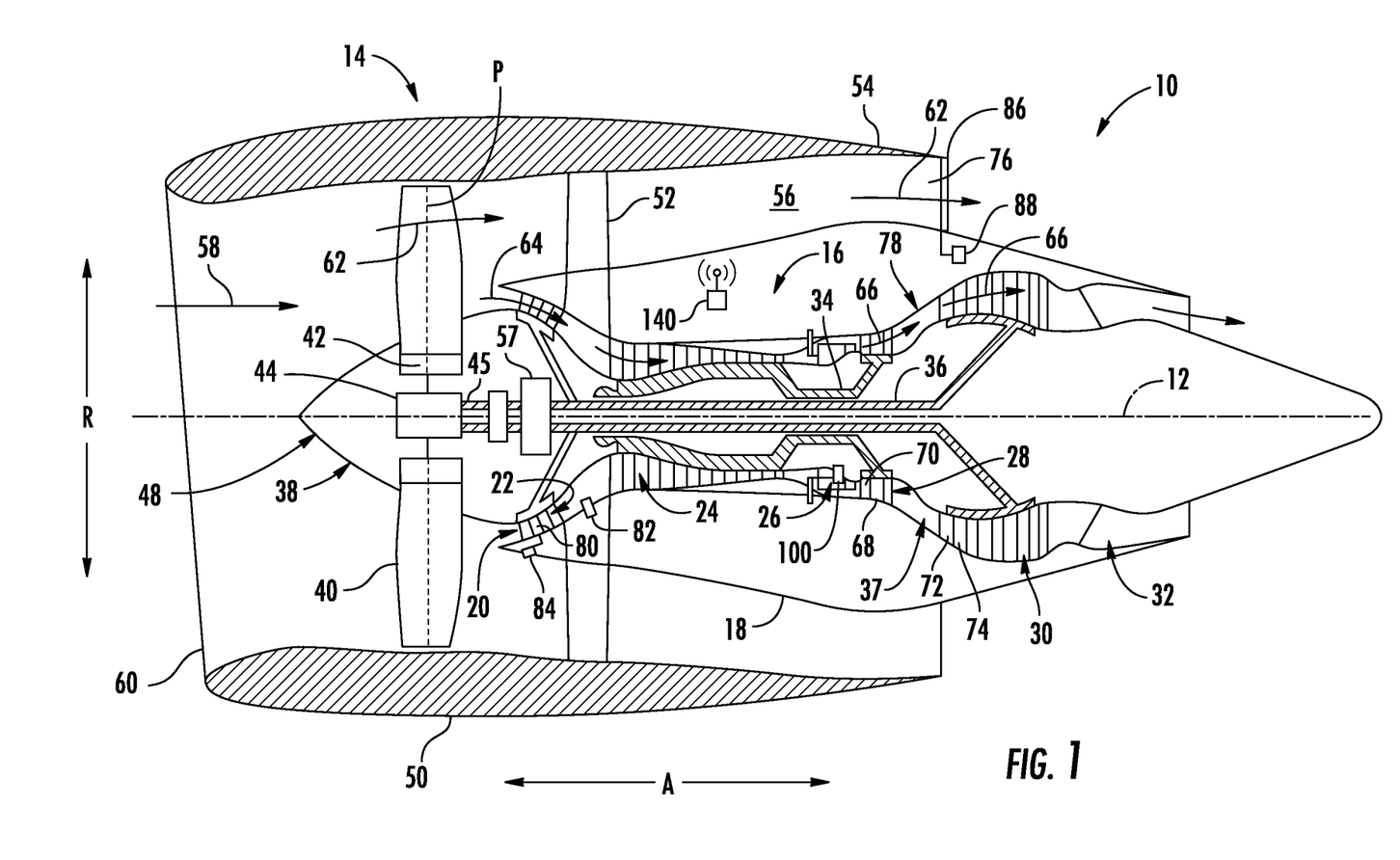
FIG. 1 is a cross-sectional view of a ducted gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine jet engine is an aeronautical, turbofan engine 10, configured to be mounted to an aircraft, such as in an under-wing configuration or tail-mounted configuration.

As shown in FIG. 1, the turbofan engine 10 defines an axial direction A (extending parallel to a longitudinal centerline axis 12 provided for reference), a radial direction R, and a circumferential direction (i.e., a direction extending about the axial direction A; not depicted).

In general, the turbofan engine 10 includes a fan section 14 and a turbomachine 16 disposed downstream from the fan section 14. The turbomachine 16 is sometimes also, or alternatively, referred to as a "core turbine engine".

The exemplary turbomachine 16 includes an outer casing 18 that is substantially tubular and defines an annular inlet 20. The outer casing 18 encases, in serial flow relationship: a compressor section including a first, booster or low pressure (LP) compressor 22 and a second, high pressure (HP) compressor 24; a combustion section including a combustor 26; a turbine section including a first, high pressure (HP) turbine 28 and a second, low pressure (LP) turbine 30; and a jet exhaust nozzle section 32.

A high pressure (HP) shaft or HP spool 34 drivingly connects the HP turbine 28 to the HP compressor 24. A low pressure (LP) shaft or LP spool 36 drivingly connects the LP turbine 30 to the LP compressor 22. The compressor section, combustion section, turbine section, and jet exhaust nozzle section 32 are arranged in serial flow order and together define a core air flowpath 37 through the turbomachine 16.

The fan section 14 includes a fixed pitch, single stage fan 38. The fan 38 includes a plurality of rotatable fan blades 40 coupled to a disk 42 in a spaced apart manner. As depicted, the fan blades 40 extend outwardly from disk 42 generally along the radial direction R.

In alternative embodiments, the fan 38 may have a variable pitch. In such embodiments, the fan blades 40 are operatively coupled to one or more suitable actuators 44. For example, the actuators 44 may be configured to collectively or independently vary the pitch of the fan blades 40 with respect to pitch axis P.

A fan drive shaft 45 is operatively connected to and drives the fan 38. The fan blades 40 and disk 42 are together rotatable about the longitudinal centerline axis 12 by the fan drive shaft 45. The fan section 14 is connected to the turbomachine 16. In particular, the fan drive shaft 45 is connected to the LP spool 36.

The disk 42 is covered by a rotatable front nacelle 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

Moreover, for the embodiment depicted, the nacelle 50 is supported relative to the turbomachine 16 by a plurality of circumferentially-spaced outlet guide vanes 52. A downstream section 54 of the nacelle 50 extends over an outer portion of the turbomachine 16 so as to define a bypass airflow passage 56 therebetween.

A gearbox 57 connects the fan drive shaft 45 with the LP shaft 36. As such, the fan drive shaft 45 and LP shaft 36 may rotate at the same speed or otherwise at related speeds.

During operation of the turbofan engine 10, a volume of air 58 enters the turbofan engine 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrow 64 is directed or routed into the core air flowpath 37.

The pressure of the second portion of air 64 is increased as it is routed through the LP compressor 22 and the HP compressor 24 and into the combustor 26. More specifically, the compressor section, including the LP compressor 22 and HP compressor 24, defines an overall pressure ratio during operation of the turbofan engine 10 at a rated speed.

The compressed second portion of air 64 from the compressor section mixes with fuel and is burned within the combustion section to provide combustion gases 66. The combustion gases 66 are routed from the combustor 26, through the HP turbine 28 where a portion of thermal and/or kinetic energy from the combustion gases 66 is extracted via sequential stages of HP turbine stator vanes 68 that are coupled to the outer casing 18 and a plurality of HP turbine rotor blades 70 that are coupled to the HP spool 34, thus causing the HP spool 34 to rotate, supporting operation of the HP compressor 24.

The combustion gases 66 are then routed through the LP turbine 30 where a second portion of thermal and kinetic energy is extracted from the combustion gases 66 via sequential stages of LP turbine stator vanes 72 that are coupled to the outer casing 18 and a plurality of LP turbine rotor blades 74 that are coupled to the LP spool 36, thus causing the LP spool 36 to rotate, supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased by the fan 38 as the first portion of air 62 is routed through the bypass airflow passage 56 before it is exhausted from a variable area fan nozzle (also referred to as a variable fan nozzle) 76 of the turbofan engine 10, also providing propulsive thrust. The variable fan nozzle 76 allows for a change in the nozzle exhaust area, changing the operating conditions of the fan 38 beyond that achieved by changing the rotational speed. In other embodiments, the fan nozzle 76 may have a fixed area throughout the entire aircraft mission envelope. The HP turbine 28, the LP turbine 30, and the jet exhaust nozzle section 32 at least partially define a hot gas path 78 for routing the combustion gases 66 through the turbomachine 16.

During operation of the turbofan engine 10, the fan 38 defines a fan pressure ratio. As used herein, the term "fan pressure ratio" refers to a ratio of an air pressure immediately downstream of the fan to an air pressure immediately upstream of the fan.

The low pressure compressor 22 may include variable stator vanes (VSV) 80 and a variable bleed valve (VBV) 82 is positioned along the core duct between the low pressure compressor 22 and the high pressure compressor 24.

The variable stator vanes 80 are disposed around the longitudinal axis 12. Each variable stator vane 80 has a root and a tip and a span defined therebetween. Each variable stator vane 80 defines a central blade axis and is rotatable about their respective central blade axis, e.g., in unison with one another. One or more actuators 84 are provided to facilitate such rotation and therefore may be used to change a pitch of the variable stator vane 80 about their respective central blade axis.

The pitch angle of the variable stator vanes 80 may be controlled to control the amount of air through the low pressure compressor 22 or otherwise into the high pressure compressor 24.

The variable bleed valve 82 can be controlled to adjust the mass flow entering the HP compressor 24.

Air 62 that is directed or routed into the bypass airflow passage 56 may exit through the fan duct exhaust nozzle 76 to produce propulsive thrust. The bypass airflow passage 56 is an annular duct positioned generally outward of the core duct or turbomachine 16 along the radial direction R. In the embodiment shown in FIG. 1, the area of the fan duct exhaust nozzle 76 is variable. For example, the variable fan nozzle 76 has a variable area 86 that is controlled by an actuator 88 to change the area 86 of the variable fan nozzle 76. The area 86 of the variable fan nozzle 76 at least partially determines the thrust through the bypass airflow passage 56.

The engine 10 may include an alternative power source that is configured to add power to the core or HP spool 34. The alternative power source may include a fuel cell 100, an auxiliary power unit (APU), a battery 101, combinations thereof, and the like. An alternative power source may refer to a power source that is an alternative or separate from a primary power source. In the case of the engine 10, the fuel to the combustor 26 may be considered a primary power source. The alternative power source is configured to add second power to the HP spool 34 in addition to first power provided to the engine 10 by the primary power source.

Power from the alternative power source may be transferred to the HP spool 34 by, for example, an electric machine assembly 102, a hybrid electric motor-generator combination, another engine, combinations thereof, and the like.

Figure 2:
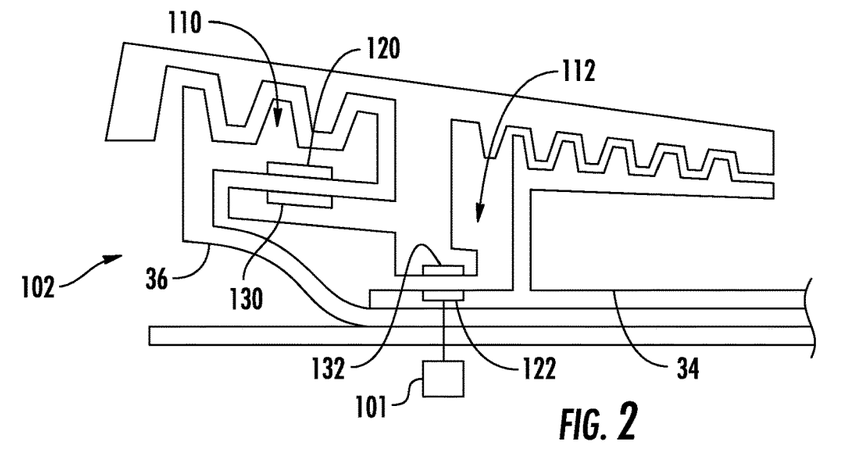
FIG. 2 is a schematic view of the engine of FIG. 1, including an electric machine, in accordance with an exemplary aspect of the present disclosure.

For example, the alternative power source is shown as the fuel cell 100 in FIG. 1 and the alternative power source is shown the battery 101 powering the electric machine 102 in FIG. 2.

Adding power to the HP spool via an alternative power source can allow the HP spool to produce more thrust, allowing the LP spool, particularly the fan to produce a lower thrust while still maintaining the total thrust produced by the engine. Lower thrust from the fan results in lower fan noise. Reducing fan noise can lower total engine noise since the fan tends to be the largest component of noise. In one embodiment, the alternative power source facilitates transfer of power from the LP spool 36 to the HP spool 34 in that the overall power of the LP spool 36 may decrease and the overall power of the HP spool 34 (e.g., the HP spool 34 absent the alternative power source) may increase.

In other embodiments where the alternate power source is the fuel cell 100, the battery 101, or an APU, the alternate power source supplies power to the HP spool 34 without drawing power from the LP spool 36, i.e., there is no transfer of power from the LP spool 36 to the HP spool 34. In this case, the alternative power source may operate at a maximum power output during a duration of a noise sensitive condition. For example, for a fuel cell, the maximum power output may be 5% to 30% greater than an average power supplied by the alternative power source absent control in response to a noise sensitive condition. For example, the fuel cell extended power output may be achieved by adjusting one or multiple of fuel cell operating conditions such as higher electrical current, higher fuel utilization, higher fuel cell fuel flowrate, higher fuel cell pressure and temperature.

Referring to FIG. 2, the electric machine is coupled to the HP spool 34 to transfer power from the battery 101 to the HP spool 34. The electric machine assembly 102 includes a first electric machine 110 disposed at the LP spool 36 and a second electric machine 112 disposed at the HP spool 34.

The first electric machine 110 may generally include a generator or motor including a first rotor assembly 120 and a first stator assembly 130. The second electric machine 112 may generally include a generator or motor including a second rotor assembly 122 and a second stator assembly 132.

The first rotor assembly 120 is coupled to the LP spool 36 and is configured to rotate at a first speed around the first stator assembly 130. The second rotor assembly 122 is coupled to the HP spool 34 and is configured to rotate at a second speed around the second stator assembly 132. The second speed is generally different from the first speed.

The electric machines 110, 112 may include one or more of a bearing assembly, a lubricant fluid system for the bearing assembly, a starter motor, an alternator/generator, a thermal management system (e.g., fuel, oil, hydraulic fluid, and/or air heat exchanger), or combinations thereof. For example, the electric machine 110, 112 may further include one or more pumps, sumps, dampers, supply conduits, scavenge conduits, buffer fluid conduits, etc., for a lubricant fluid system in addition to the stator assembly 130, 132. The electric machines 110, 112 may further include a speed reduction device, such as a transmission or gear assembly, a pneumatic or hydraulic speed reduction assembly, etc. that may change the rotational speed from the LP spool 36 relative to the HP spool 34.

The first stator assembly 130 and the second stator assembly 132 may be in communication with one another (e.g., electrically connected). The first stator assembly 130 and the second stator assembly 132 are configured to be controlled to adjust (e.g., increase or decrease) a first electrical load, resistance, or impedance of the first stator/rotor combination (e.g., the first stator assembly 130 and the first rotor assembly 120) and/or to adjust (e.g., increase or decrease) a second electrical load, resistance, or impedance of the second stator/rotor combination (e.g., the second stator assembly 132 and the second rotor assembly 122).

For example, the electrical machines 110, 112 are configured to be controlled to control the speeds (N1, N2) of the LP spool 36 and the HP spool 34, where each defines a rotatable speed mechanically independent of the other. For example, the electric machine 110 can apply a load to the LP spool 36 (e.g., operate as a generator) to transfer power from the LP spool 36 and/or the electric machine 112 can drive the HP spool 34 (e.g., operate as a motor) to transfer power to the HP spool 34, and facilitate transfer power from the LP spool 36 to the HP spool 34.

Applying or increasing a load on the LP spool 36 decreases a first rotational speed (N1) of the LP spool 36. For example, the first rotational speed (N1) may be reduced by up to approximately 10-20% relative to a minimum steady state first rotational speed (N1) defined with approximately no electrical load applied to the LP spool 36.

Driving the HP spool 34 increases a second rotational speed (N2) of the HP spool 34. For example, the increase in the second rotational speed (N2) of the HP spool 34 may increase a flow of air through the core engine.

Figure 3:
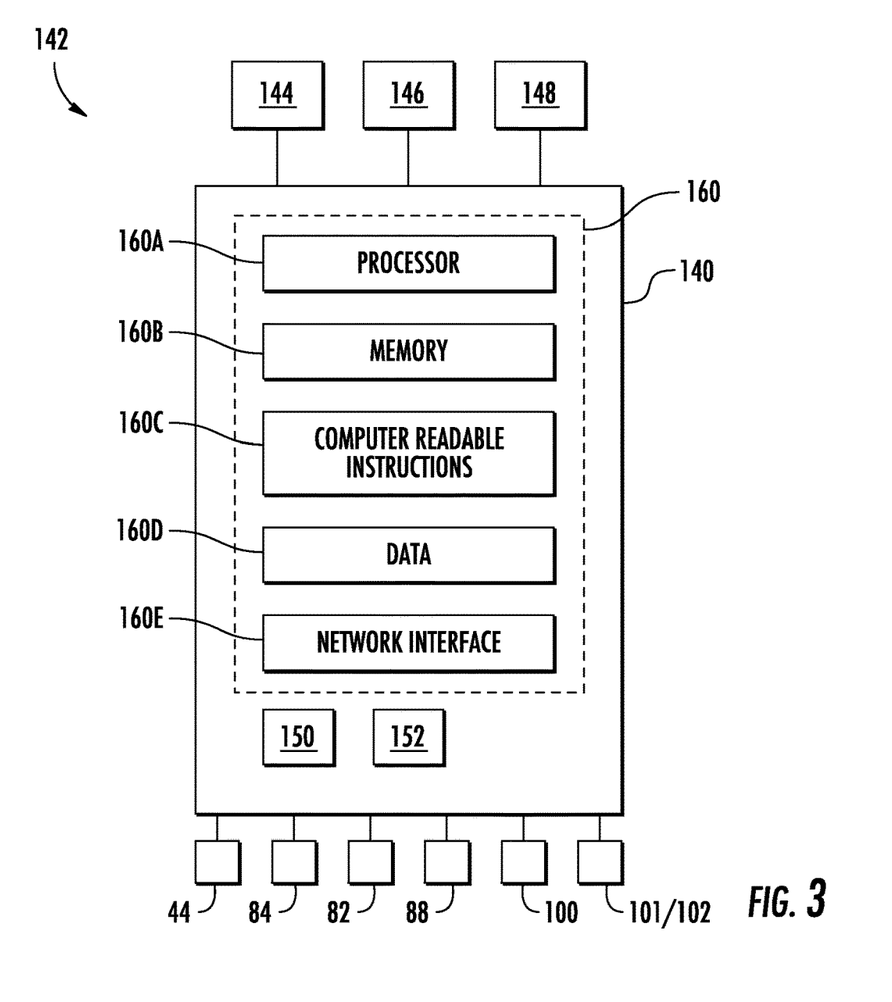
FIG. 3 is a schematic view of a controller, in accordance with an exemplary aspect of the present disclosure.

Referring to FIGS. 1 and 3, the controller 140 may be part of a control system 142. The control system 142 may include engine controllers 140, a flight management system 144, manual aircraft controls 146 (e.g., including a selectable quiet mode), and sensors 148.

In one or more exemplary embodiments, the controller 140 depicted in FIGS. 1 and 3 may be a stand-alone controller such as a Full Authority Digital Engine Control (FADEC) for providing full digital control of the engine 10. In some alternative embodiments, the engine 10 can include more than one controller for controlling the engine 10, and controllers may be connected with or integrated into one or more of a controller for the engine 10, a controller for the aircraft, the control system 142, etc. For example, the engine controller 140 may be integrated into or connected to a global supervisory control.

As described above, the control 140 is configured to control the engine 10 to limit noise generated by the engine 10. For example, the alternative power source, engine geometries, and operational conditions of the engine 10 are controlled by the controller 140 and/or the controller is otherwise configured to make control decisions based on a noise sensitive condition 150.

The controller 140 can control various aspects of the engine 10 and may include system-specific or function-specific controls. For example, the controller 140 may include a noise reduction control and a power management schedule or control. The power management schedule or control may, for example, dictate the contribution from the alternative power source (e.g., fuel cell 100 and/or battery 101), and engine geometries based on a desired power or thrust output for the engine 10, including the pitch of variable stator vanes 80 and an area of the variable fan nozzle 76.

As shown in FIGS. 1 and 3, the controller 140 may be configured to indirectly or directly control the speed of the LP spool 36, the HP spool 34, the alternative power source (e.g., fuel cell 100 and/or battery 101), and the actuators 44, 84, 88.

The controller 140 can include one or more computing device(s) 160. The computing device(s) 160 can include one or more processor(s) 160A and one or more memory device(s) 160B. The one or more processor(s) 160A can include any suitable processing device, such as a microprocessor, microcontroller, integrated circuit, logic device, and/or other suitable processing device. The one or more memory device(s) 160B can include one or more computer-readable media, including, but not limited to, non-transitory computer-readable media, RAM, ROM, hard drives, flash drives, and/or other memory devices.

The one or more memory device(s) 160B can store information accessible by the one or more processor(s) 160A, including computer-readable instructions 160C that can be executed by the one or more processor(s) 160A. The instructions 160C can be any set of instructions that when executed by the one or more processor(s) 160A, cause the one or more processor(s) 160A to perform operations.

In some embodiments, the instructions 160C can be executed by the one or more processor(s) 160A to cause the one or more processor(s) 160A to perform operations, such as any of the operations and functions for which the controller 140 and/or the computing device(s) 160 are configured, the operations for operating an engine 10 according to a noise sensitivity condition (e.g., methods described below), as described herein, and/or any other operations or functions of the one or more computing device(s) 160. The instructions 160C can be software written in any suitable programming language or can be implemented in hardware. Additionally, and/or alternatively, the instructions 160C can be executed in logically and/or virtually separate threads on processor(s) 160A.

For example, a noise reduction control, a base power management control, an alternative power source control, a bleed valve control, a stator vane control, a fan speed control, a variable fan nozzle area control, and a thrust control may be implemented as control modules including instructions 160C that are executed to provide the control functionality.

The memory device(s) 160B can further store data 160D that can be accessed by the processor(s) 160A. For example, the data 160D can include data indicative of evaluations of noise values or levels based on sensor measurements, data from a flight management system, data indicative of engine/aircraft operating conditions, and/or any other data and/or information described herein.

The computing device(s) 160 can also include a network interface 160E used to communicate, for example, with the other components (e.g., other components of the engine 10, the aircraft, the control system 142, etc.) For example, in the embodiment depicted, as noted above, the engine 10 includes one or more sensors 148 for sensing data indicative of one or more parameters of the engine 10, the aircraft, or both.

The controller 140 is operably coupled to the one or more sensors 148 through, e.g., the network interface 160E, such that the controller 140 may receive data indicative of various operating parameters sensed by the one or more sensors 148 during operation.

The network interface 160E can include any suitable components for interfacing with one or more network(s), including for example, transmitters, receivers, ports, controllers, antennas, and/or other suitable components.

The technology discussed herein refers to computer-based systems, and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The flight management system 144 may include a navigational database and may use data from sensors 148 such as a global positioning system (GPS), distance measuring equipment (DME), VHF omnidirectional range (VOR), non-directional beacons (NDBs), and the like to navigate a flight plan. The navigational database may include noise thresholds or noise limits for waypoints of the flight plan.

The manual aircraft controls 146 may include manual controls configured to set a threshold or select a mode such as quiet mode (e.g., having a predetermined lower noise threshold). For example, a manual aircraft control 146 may be used to reduce the community noise generated by the engine during climb out or landing.

The controller 140 may receive and/or evaluate data to determine the noise sensitive condition 150. For example, the noise sensitive condition 150 may include noise thresholds 152, limits, or target amounts of noise reduction (e.g., amount of noise reduction to achieve a target noise level), an amount of departure from an average or acceptable level of noise, and the like. The noise sensitive condition 150 may be determined or based on other conditions being met, by manual selection or initiation of a mode, combinations thereof, and the like.

The noise thresholds 152, limits, and the like may be looked up in a table of threshold noise levels based other factors or conditions related to the noise sensitive condition such as location, time of day, altitude or distance above ground level, etc. For example, the noise sensitive condition 150 may be a function of at least one of a location along a flight path, a time of day, and an altitude or distance above ground level. The noise sensitive condition 150 may be specific to noise measurement points encountered during operations including approach, sideline, and cutback.

Here, the noise sensitive condition 150 may be a scheduled or predetermined noise threshold 152 that is triggered or determined based on one or more conditions such as location, time of day, altitude or distance above ground level, and the like. Such conditions may be detected by a sensor 148, the flight management system 144, and the like as described in further detail below. The noise threshold 152 may be implemented for a limited time during which the under-lying conditions hold.

The noise sensitive condition 150 may also be determined or implemented based on a selection of a mode or manual setting. In such cases, a noise threshold 152 may be manually selected or may be automatically determined by analyzing noise values measured over time. A noise value may be continuously measured and analyzed, and a feedback control implemented to keep the noise level at (or within a certain range of) an average or acceptable noise level (which may depend on various conditions). Here, a noise sensitive condition 150 may be implemented in a non-scheduled manner including using control functions to maintain a noise level.

A noise value 170 or noise level may be determined based on one or more measurements or data from sensors 148 associated with the engine 10 or aircraft. Sensors may be located on or in the aircraft fuselage, in the cabin, may be part of (on or in) the engine 10, or at other locations on the aircraft.

Exemplary sensors include acoustic sensors, accelerometers or vibration sensors, pressure sensors, temperature sensors (e.g., exhaust gas temperature (EGT) sensors), and the like. Exemplary sensors may also include an altitude sensor, a global positioning system (GPS), a distance sensor, a timer, other sensors discussed below with respect the flight management system 144, and the like.

A noise sensitive condition 150 may also include a noise value 170 approaching or exceeding a noise threshold 152 (e.g., a noise threshold set as part of a silent mode). Noise threshold 152 may be set or selected via the manual aircraft control 146 and/or determined from the flight management system 144.

A noise sensitive condition 150 may be determined by the flight management system 144. The noise sensitive condition 150 may include noise thresholds, limits, or target amounts of noise reduction at waypoints along a flight path. The flight management system 144 may provide signals or data indicative of the noise sensitive conditions 150 such that the controller 140 can implement control schemes for noise reduction at scheduled (or non-scheduled) waypoints along the flight path.

The controller 140 may operate according to a schedule and/or with input from an above ground level (AGL) sensor to reduce community noise during takeoff and landing operations. Noise may be measured by ground level sensors at noise measurement points (e.g., acoustic certification points) including at sideline, cutback, and approach. Sideline may be a lateral full-power noise measurement point during takeoff where the noise level is maximum and 1,476 feet to the side of the runway; cutback may be a flyover noise measurement point at a distance of 21,325 feet from a start of roll on the runway; and approach may be a noise measurement point 6,562 feet from the threshold of a runway, for example.

Figure 4:
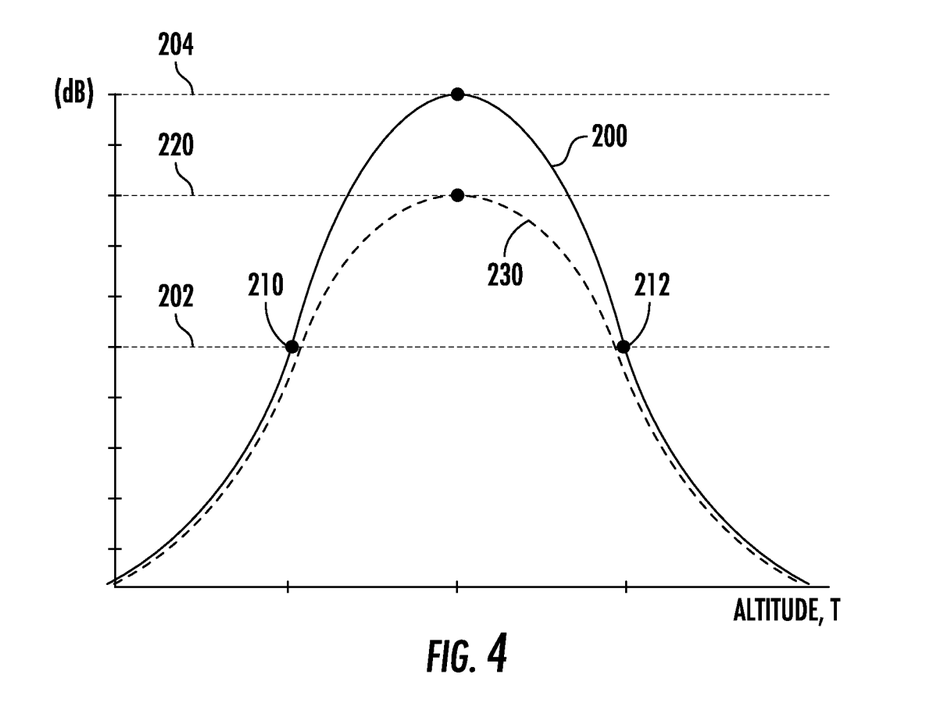
FIG. 4 is a graphical illustration of an exemplary noise profile in accordance with an exemplary aspect of the present disclosure.

Referring to FIG. 4, an exemplary noise profile 200 (e.g., a Perceived Noise Level with Tone Correction (PNLT) curve) for an aircraft at a sideline noise measurement point is illustrated. Here, the noise profile 200 hits a measurement level 202 (here, −10 dB from a nominal peak level 204) on the advancing side at 400 feet of altitude or above ground level; hits the nominal peak level 204 at approximately 1000 feet of altitude or above ground level; and hits the measurement level 202 on the retreating side at 1600 feet of altitude or above ground level for the sideline certification condition. The noise profile 200 may hit the measurement level 202 on the retreating side as high as, for example, 4000 feet at a cutback operating condition. It will be appreciated that the altitudes or distances above ground level associated with the noise profile of FIG. 4 are by way of example only.

The noise profile 200 may be measured by a ground level sensor at a noise measurement point. For purposes of calculating a noise rating, the noise profile 200 may begin at a time (e.g., point 210) when the noise is at the measurement level 202 on the advancing side and end at a time (e.g., point 212) when then noise is at the measurement level 202 on the retreating side. A noise rating may be based on the area between the noise profile 200 and the measurement level 202 between points 210, 212. Other measurement levels 202, 204 may be used and may vary based on regulations at different locations, times of day, combinations thereof, and the like.

To achieve a reduced noise profile 230 for a target level 220 (e.g., reduced with respect to the nominal noise profile 200 that may be used for measurement levels 202, 204), the controller 140 may determine a noise control scheme described in further detail below.

The controller 140 may implement the control scheme to achieve maximum engine efficiency at runway takeoff (e.g., 0 to 400 feet above ground level) and then to achieve minimum noise for lateral and flyover acoustic measurement points (e.g., when the aircraft is at 400 feet to 4000 feet Above Ground Level). Accordingly, the control for noise reduction may begin at or before the time, location, and/or distance above ground level when the noise rises above a level −10 dB from the target level 220.

As the location or time along a flight path when the noise rises above a level −10 dB from the target level 220 is associated with an altitude, above ground level (AGL) distance, location, distance, or time (e.g., based on a typical noise profile), control for noise reduction may be based on a command or indication from the flight management system 144 of a noise sensitive condition 150. Additionally or alternatively, a determination may be made from a measurement from a sensor 148 including an above ground level (AGL) sensor (e.g., altitude or distance above ground measured from, e.g., a takeoff point or brake release), a measurement of location (e.g., from a global positioning system (GPS)), a measurement from a distance sensor, a measurement from a timer (e.g., a time after wheels up), combinations thereof, and the like.

Figure 5:
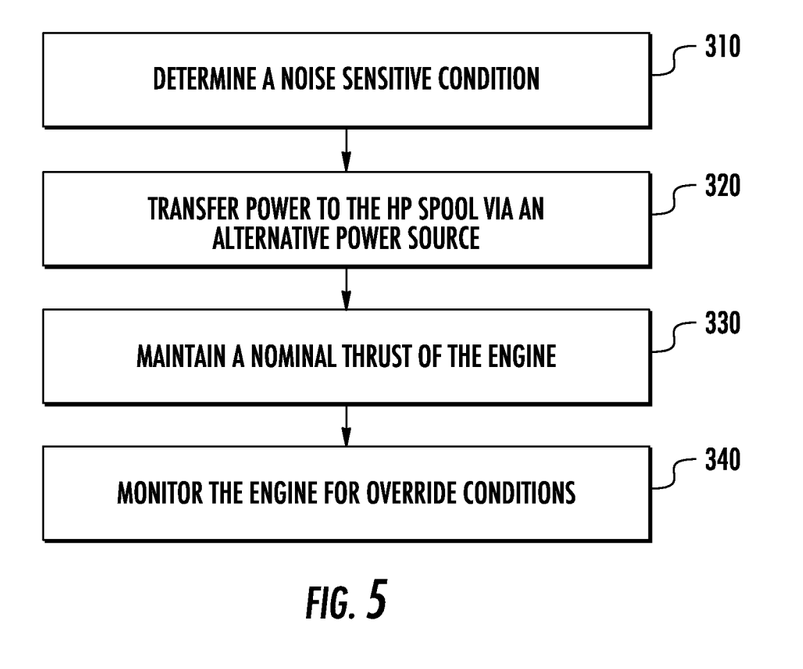
FIG. 5 is an illustration of a noise reduction method, in accordance with an exemplary aspect of the present disclosure.

The controller 140 is configured to implement an exemplary method 300. For purposes of teaching, the method 300 is described with respect to the controller 140 although the steps may be alternatively implemented by the control system 142.

According to a first step 310, the controller 140 determines a noise sensitive condition 150.

According to a second step 320, the controller 140 determines and/or executes a predetermined control scheme to reduce noise based on the noise sensitive condition 150 including transferring power to the HP spool 34 via an alternative power source and/or from a second engine, and/or transferring power from the LP spool 36.

According to a third step 330, the determined or given control scheme is further configured to maintain a nominal total thrust of the engine. This may require the controller to additionally modulate engine variable geometries and/or fuel flow.

According to a fourth step 340, the controller 140 monitors the engine 10 for override conditions. Steps of the method 300 are now described in further detail.

As described in further detail below, transferring power from the LP spool 36 to the HP spool 34 may include adding power to the HP spool 34 via control of the alternative power source (e.g., fuel cell 100 or battery 101). For example, the alternative power source (e.g., fuel cell 100 or battery 101) is controlled by control 140 to add power to the HP spool 34.

The controller 140 may determine a maximum extent to which power can be added to the HP spool 34. For example, input from sensors (e.g., an exhaust gas temperature (EGT) sensor) may be used to determine the maximum extent to which power can be added to the HP spool from an overall engine performance or turbine lifing standpoint.

Figure 6:
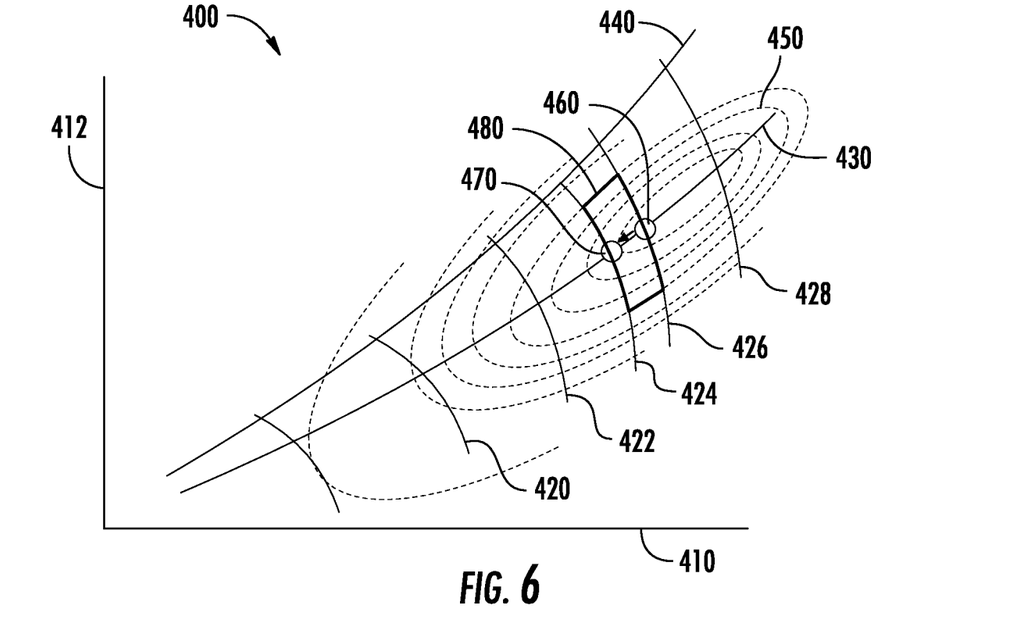
FIG. 6 is a graphical illustration of a first compressor map, in accordance with an exemplary aspect of the present disclosure.
Figure 7:
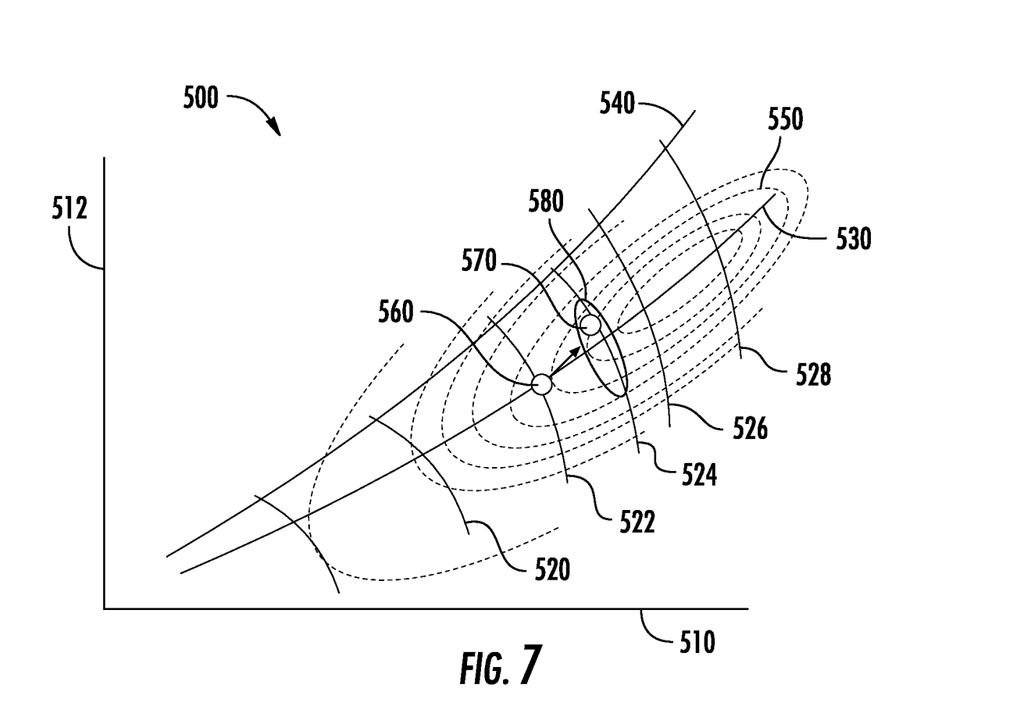
FIG. 7 is a graphical illustration of a second compressor map, in accordance with an exemplary aspect of the present disclosure.

The control 140 may utilize compressor maps 400, 500 to determine an adjustment or control of power added or removed, or a load applied or removed, at the LP spool 36 and/or HP spool 34. For example, the extent to which power can be added to the HP spool 34 and reduced at the LP spool 36 (e.g., transferred) while maintaining an amount of operational efficiency, surge margin, etc. may be determined from operating points on the compressor maps 400, 500.

Referring to FIGS. 6 and 7, for each of the fan 38 (FIG. 6) and the HP compressor 24 (FIG. 7), a compressor map 400, 500 may generally illustrate a range and operational efficiency of the fan 38, and HP compressor 24, respectively.

The compressor maps 400, 500 are generally defined by air flow rate of the fan 38 or HP compressor 24 on a first axis 410, 510 (x-axis) and a pressure ratio (e.g., pressure downstream at a compressor exit over pressure upstream at a compressor inlet) of the fan 38 or HP compressor 24 on a second axis 412, 512 (y-axis).

One or more speed lines 420, 422, 424, 426, 428; 520, 522, 524, 526, 528 are defined. For example, the speed lines 420, 422, 424, 426, 428; 520, 522, 524, 526, 528 may generally define a constant rotational or corrected speed of a rotor blade tip (e.g., the rotational speed corrected to ambient conditions on a standard day as generally known in the art).

The compressor map 400, 500 further defines a nominal operating line 430, 530 (also referred to as a working line or running line). The nominal operating line 430, 530 generally defines points at which the engine 10 generally operates relative to the speed lines 420, 422, 424, 426, 428; 520, 522, 524, 526, 528. The nominal operating line 430, 530 represents nominal flowrate/speed and the ratio N1/N2, where N1 is the rotational speed of the LP spool 36 and N2 is the rotational speed of the HP spool 34. N1 may serve as the primary power setting and N2 may indicate if systems have sufficient power. The ratio N1/N2 may indicate if the systems have sufficient power to support the power setting.

The compressor map 400, 500 further defines a stall line 440, 540. The stall line 440, 540 generally defines a region above which flow is unstable, such as to result in flow separation across the airfoils of the fan or compressor and disrupt flow through the compressor. Compressor stall is generally undesired in the operation of the fan or compressor section.

The margin between the nominal operating line 430, 530 and the stall line 440, 540 generally defines a stall margin of the fan or compressor.

The compressor map 400, 500 may further include contour lines 450, 550 representing efficiency.

Although the compressor map 400, 500 is generally provided herein as a chart or graph, it should be appreciated that the data or information provided therein, such as described further below, may be defined as one or more of a database, a table, a function, a chart, a graph, etc., and may further be stored, utilized, manipulated, or updated within a controller (e.g., controller 140).

The controller 140 is configured change operating points for the fan 38 or compressor 24 from a nominal operating point 460, 560 to a noise reduction operating point 470, 570.

For purposes of teaching, in FIG. 6, the nominal operating point 460 is located on the nominal operating line 430 and on the speed line 426. Power reduction at the LP spool 36 moves an operating point from the nominal operating point 460 to the noise reduction operating point 470. For example, with a fixed fan nozzle, the noise reduction operating point 470 may be located on the nominal operating line 430 on the speed line 424, where the speed line 424 represents a lower speed than the speed line 426. Reducing the speed of the fan 38 reduces the noise of the engine 10. For a variable area fan nozzle, the noise reduction operating point may be located away from the nominal operating line 430 at the same speed line 426 or a different speed line 424 (represented by an area 480 on the compressor map 400).

For purposes of teaching, in FIG. 7, the nominal operating point 560 is located on the nominal operating line 530 and on the speed line 522. Adding power to the HP spool 34 moves an operating point from the nominal operating point 560 to the noise reduction operating point 570. For example, the noise reduction operating point 570 may be on the speed line 524, where the speed line 524 represents a higher speed than the speed line 522. Here, the speed of the HP spool 34 is increased.

The noise reduction operating point 570 may be on, above, or below the nominal operating line 530 (for example, represented by an area 580 on the compressor map 500). In particular, noise reduction operating point 570 may move off of the nominal operating line 530 (e.g., offset from the nominal operating line 530).

As the engine 10 has variable geometry, controller 140 may control the geometry of the engine 10 according to a desired noise reduction operating point 470, 570. The controller 140 may coordinate control of variable geometries (e.g., VSV, VBV, fan pitch, fan nozzle area etc.) with the addition and reduction of power (e.g., transfer) to achieve the noise reduction operating points 470, 570, for example, that maintain adequate stall margin.

As the overall noise produced by the engine 10 tends to be dominated by the fan 38, reducing power of the LP spool 36 can reduce the overall noise signature of the engine 10 at certain operating conditions. The reduced speed of the fan 38 reduces noise, for example, at one or more of a lateral, flyover, or approach noise certification condition. For a ducted fan, the noise from the fan system may vary approximately as RPMA5. Thus, there is a steep dropoff in noise with reduction in speed.

Reduced power of the LP spool 36 reduces the speed of the fan 38 (e.g., fan tip speed) with respect to a nominal speed (e.g., on the nominal operating point 460, 560).

The nominal speed (e.g., nominal operating points 460, 560) may be one that is optimized for fuel efficiency (e.g., a lowest fuel burn) and/or turbine life considerations. A speed that is alternatively or additionally optimized or selected within an acceptable range of fan tip speeds to reduce noise (e.g., noise reduction operating points 470, 570) may be referred to as a noise reduction speed.

Reducing the speed of the fan 38 can also reduce the thrust produced by the LP spool 36. For a fixed pitch fan and a fixed fan nozzle, the LP system thrust reduces with reducing fan speed. However, the power added to the HP spool 34 increases the speed of the HP spool 34. In combination with any needed change in fuel flow, the thrust produced on the HP spool 34 increases to compensate for the loss in thrust on the LP spool 36. Even though the noise produced by the HP spool 34 may increase, this is more than offset by the reduction in fan noise, resulting in an overall engine noise benefit.

For a variable pitch fan 38, to maintain overall engine thrust with reduced speed of the fan 38, the pitch of the fan blades 40 may be changed to increase the thrust produced by the fan 38 to offset a decrease in thrust from the LP spool 36. Similarly for an engine with a variable fan nozzle (76), the nozzle area may be modulated to offset some decrease in thrust from the LP spool 36. In other noise reduction embodiments, the controller 140 may only modulate the variable geometries on the fan system (i.e., without transferring power from the LP spool 36 to the HP spool 34) to either reduce the speed of the fan or change the fan nozzle area to reduce noise without reducing fan thrust. In yet other embodiments, variable geometries on the fan may be modulated with power addition to the HP spool to further reduce noise.

The controller 140 may monitor for conditions where the method 300 should be discontinued or overridden. Such conditions include instances where performance and/or health of the engine is reduced. For example, the controller may monitor engine gas temperature measurements from a sensor 148 of the engine 10 and end the noise reduction method if the temperature reaches a limit.

In some cases, fuel burn may override noise sensitive conditions.

The noise reduction method may otherwise be overridden by other situations such as if one of the engines is inoperative (one engine inoperative, OEI) and the full thrust performance of the functioning engine is needed or go-around conditions.

It should be appreciated that the exemplary engine 10 depicted in FIG. 1 is by way of example only, and that in other exemplary embodiments, the engine 10 may have any other suitable configuration. For example, aspects of the present disclosure may be utilized with any other suitable aeronautical gas turbine engine, such as a turboshaft engine, turboprop engine, turbojet engine, or other engine architectures with open fans, etc. For example, other engines are disclosed in U.S. patent application Ser. No. 17/526,383, filed Nov. 15, 2021, which is hereby incorporated by reference. Further, aspects of the present disclosure may further be utilized with any aeroderivative gas turbine engine, such as a nautical gas turbine engine.

Benefits of noise reduction include complying with regulations, and reducing the amount of noise at ground level (e.g., community noise) and/or in the cabin of the aircraft. Community noise may include noise produced near ground level during takeoff and landing operations. An allowable level of community noise may depend on a location and a time of day.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An aircraft engine, comprising: a low pressure spool; and a high pressure spool; a primary power source configured to provide first power to the engine; an alternative power source configured to add second power to the high pressure spool, wherein the second power is in addition to the first power provided to the engine by the primary power source; a controller configured to: determine a noise sensitive condition; and control, in response to determining the noise sensitive condition, the alternative power source to add power to the high pressure spool.

The engine of one or more of these clauses, wherein adding power to the high pressure spool moves an operating point on a compressor map of the high pressure compressor of the high pressure spool from a nominal operating point to a noise reduction operating point.

The engine of one or more of these clauses, wherein the controller is further configured to control at least one of fuel flow rate, variable stator vanes, a fan pitch setting, and a variable fan nozzle to operate at the noise reduction operating point based on the noise sensitive condition.

The engine of one or more of these clauses, wherein the noise reduction operating point is offset from a nominal operating line of the compressor map of the high pressure compressor.

The engine of one or more of these clauses, wherein the controller is configured to reduce power to the low pressure spool.

The engine of one or more of these clauses, wherein the controller is configured to control an electric machine to apply a load to the low pressure spool.

The engine of one or more of these clauses, wherein reducing power of the low pressure spool moves an operating point on a compressor map of the fan from a nominal operating point to a noise reduction operating point.

The engine of one or more of these clauses, wherein the alternative power source includes at least one of a fuel cell, a battery, and an auxiliary power unit (APU).

The engine of one or more of these clauses, wherein the controller is configured to control the alternative power source to supply power that is 5% to 30% greater than a nominal power supplied by the alternative power source absent control in response to a noise sensitive condition.

The engine of one or more of these clauses, wherein the alternative power source operates at maximum power output during a duration of the noise sensitive condition.

The engine of one or more of these clauses, wherein the duration of the noise sensitive condition is based on a range of above ground level distances between 400 feet and 4000 feet.

The engine of one or more of these clauses, wherein the noise sensitive condition is based on at least one of a location, an above ground level distance, and a time of day.

The engine of one or more of these clauses, wherein the noise sensitive condition is based on a noise measurement point of at least one of approach, flyover, and lateral certification conditions.

The engine of one or more of these clauses, wherein the noise sensitive condition includes an above ground level distance between 400 feet and 4000 feet during a takeoff operation.

The engine of one or more of these clauses, wherein the noise sensitive condition includes an above ground level distance below 1000 feet during a landing operation.

The engine of one or more of these clauses, wherein the noise sensitive condition is based on a selected noise threshold.

The engine of one or more of these clauses, wherein the controller is further configured to maintain a nominal thrust of the engine.

An aircraft engine, comprising: a low pressure spool; and a high pressure spool; a primary power source configured to provide first power to the engine; an alternative power source configured to add second power to the high pressure spool, wherein the second power is in addition to the first power provided to the engine by the primary power source; a controller configured to: determine a noise sensitive condition; and in response to the noise sensitive condition: increase the speed of the high pressure spool, the high pressure spool including a high pressure compressor, wherein increasing the speed of the high pressure spool moves a first operating point on a compressor map of the high pressure compressor from a first nominal operating point to a first noise reduction operating point; and reduce the speed of a low pressure spool, the low pressure spool including a low pressure compressor, wherein reducing the speed of the low pressure spool moves a second operating point on a compressor map of the fan from a second nominal operating point to a second noise reduction operating point.

The engine of one or more of these clauses, wherein the noise reduction operating point is offset from a nominal operating line of the compressor map of the high pressure compressor.

The engine of one or more of these clauses, wherein the controller is configured to control an alternative power source to add power to the HP spool.

We claim:

1. An aircraft engine comprising:
   a low pressure spool;
   a high pressure spool;
   a primary power source configured to provide first power to the engine;
   an alternative power source configured to add second power to the high pressure spool, wherein the second power is in addition to the first power provided to the engine by the primary power source, wherein the engine is configured to produce an overall level of thrust; and
   a controller configured to:
     determine a noise sensitive condition based on at least one of a location along a flight path or an altitude above ground level; and
     control, in response to determining the noise sensitive condition, the alternative power source to add power to the high pressure spool, and
     reduce, in response to determining the noise sensitive condition, a speed of the low pressure spool while maintaining the overall level of thrust.

2. The engine of claim 1, wherein adding power to the high pressure spool moves an operating point on a compressor map of a high pressure compressor of the high pressure spool from a nominal operating point to a noise reduction operating point.

3. The engine of claim 2, wherein the controller is further configured to control at least one of fuel flow rate, variable stator vanes, a fan pitch setting, and a variable fan nozzle to operate at the noise reduction operating point based on the noise sensitive condition.

4. The engine of claim 3, wherein the noise reduction operating point is offset from a nominal operating line of the compressor map of the high pressure compressor.

5. The engine of claim 1, wherein the controller is configured to reduce power to the low pressure spool.

6. The engine of claim 5, wherein the controller is configured to control an electric machine to apply a load to the low pressure spool.

7. The engine of claim 5, wherein reducing power of the low pressure spool moves an operating point on a compressor map of a fan from a nominal operating point to a noise reduction operating point.

8. The engine of claim 1, wherein the alternative power source includes at least one of a fuel cell, a battery, and an auxiliary power unit (APU).

9. The engine of claim 1, wherein the controller is configured to control the alternative power source to supply power that is 5% to 30% greater than a nominal power supplied by the alternative power source absent control in response to a noise sensitive condition.

10. The engine of claim 1, wherein the alternative power source operates at maximum power output during a duration of the noise sensitive condition.

11. The engine of claim 1, wherein a duration of the noise sensitive condition is based on a range of above ground level distances between 400 feet and 4000 feet.

12. The engine of claim 1, wherein the noise sensitive condition is based on at least one of a location and a time of day.

13. The engine of claim 1, wherein the noise sensitive condition is based on a noise measurement point of at least one of approach, flyover, and lateral certification conditions.

14. The engine of claim 1, wherein the noise sensitive condition includes an above ground level distance between 400 feet and 4000 feet during a takeoff operation.

15. The engine of claim 1, wherein the noise sensitive condition includes an above ground level distance below 1000 feet during a landing operation.

16. The engine of claim 1, wherein the noise sensitive condition is based on a selected noise threshold.

17. The engine of claim 1, wherein reducing, in response to determining the noise sensitive condition, the speed of the low pressure spool comprises reducing, in response to determining the noise sensitive condition, the speed of the low pressure spool by modulating the primary power source while maintaining the overall level of thrust.

18. The engine of claim 17, wherein the primary power source is a fuel flow to a combustor of the aircraft engine.

19. An aircraft engine comprising:
a low pressure spool; and
a high pressure spool;
a primary power source configured to provide first power to the engine;
an alternative power source configured to add second power to the high pressure spool, wherein the second power is in addition to the first power provided to the engine by the primary power source, wherein the engine is configured to produce an overall level of thrust;
a controller configured to:
determine a noise sensitive condition based on at least one of a location along a flight path or an altitude above ground level; and
in response to the noise sensitive condition: increase the speed of the high pressure spool, the high pressure spool including a high pressure compressor, wherein increasing the speed of the high pressure spool moves a first operating point on a compressor map of the high pressure compressor from a first nominal operating point to a first noise reduction operating point; and
reduce the speed of a low pressure spool while maintaining the overall level of thrust, the low pressure spool including a low pressure compressor, wherein reducing the speed of the low pressure spool moves a second operating point on a compressor map of a fan from a second nominal operating point to a second noise reduction operating point.

20. The engine of claim 19, wherein the first noise reduction operating point or the second noise reduction operating point is offset from a nominal operating line of the compressor map of the high pressure compressor.

* * * * *